(12) United States Patent
XiaoPing et al.

(10) Patent No.: US 8,089,472 B2
(45) Date of Patent: Jan. 3, 2012

(54) BIDIRECTIONAL SLIDER WITH DELETE FUNCTION

(75) Inventors: Jiang XiaoPing, Shanghai (CN); Li GuangHai, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 735 days.

(21) Appl. No.: 11/442,044

(22) Filed: May 26, 2006

(65) Prior Publication Data
US 2007/0273659 A1    Nov. 29, 2007

(51) Int. Cl.
*G06F 3/041* (2006.01)
(52) U.S. Cl. .................. 345/173; 345/156; 178/18.06
(58) Field of Classification Search .............. 345/169, 345/172–184; 178/18.01–18.09, 19.01–19.05
See application file for complete search history.

(56) References Cited

U.S. PATENT DOCUMENTS

| | | |
|---|---|---|
| 4,283,713 A | 8/1981 | Philipp |
| 4,438,404 A | 3/1984 | Philipp |
| 4,475,151 A | 10/1984 | Philipp |
| 4,497,575 A | 2/1985 | Philipp |
| 4,736,097 A | 4/1988 | Philipp |
| 4,773,024 A | 9/1988 | Faggin et al. |
| 4,802,103 A | 1/1989 | Faggin et al. |
| 4,876,534 A | 10/1989 | Mead et al. |
| 4,879,461 A | 11/1989 | Philipp |
| 4,935,702 A | 6/1990 | Mead et al. |
| 4,953,928 A | 9/1990 | Anderson et al. |
| 4,962,342 A | 10/1990 | Mead et al. |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |

(Continued)

OTHER PUBLICATIONS

CSR User Module, CSR v1.0, CY8C21x34 Data Sheet, Copyright 2005, Cypress Semiconductor Corporation. Oct. 6, 2005, pp. 1-36 (36 is blank).

(Continued)

*Primary Examiner* — Amare Mengistu
*Assistant Examiner* — Dmitriy Bolotin

(57) ABSTRACT

A method and apparatus is disclosed herein for mapping a touch sensing device to two sets of output objects. In one embodiment, the method includes mapping a first set of output objects into a plurality of one dimensional positions of a touch sensing device when a presence of a conductive object is determined to be in a first region, among a plurality of regions, of the touch sensing device. The method further includes mapping a second set of output objects into the plurality of one dimensional positions of the touch sensing device when the presence of the conductive object is determined to be in a second region, distinct from the first region, of the touch sensing device.

19 Claims, 9 Drawing Sheets

U.S. PATENT DOCUMENTS

| | | |
|---|---|---|
| 5,166,562 A | 11/1992 | Allen et al. |
| 5,204,549 A | 4/1993 | Platt et al. |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,289,023 A | 2/1994 | Mead |
| 5,303,329 A | 4/1994 | Mead et al. |
| 5,305,017 A | 4/1994 | Gerpheide |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,374,787 A | 12/1994 | Miller et al. |
| 5,381,515 A | 1/1995 | Platt et al. |
| 5,384,467 A | 1/1995 | Plimon et al. |
| 5,408,194 A | 4/1995 | Steinbach et al. |
| 5,488,204 A | 1/1996 | Mead et al. |
| 5,495,077 A | 2/1996 | Miller et al. |
| 5,541,878 A | 7/1996 | LeMoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,614,861 A | 3/1997 | Harada |
| 5,629,891 A | 5/1997 | LeMoncheck et al. |
| 5,648,642 A | 7/1997 | Miller et al. |
| 5,682,032 A | 10/1997 | Philipp |
| 5,730,165 A | 3/1998 | Philipp |
| 5,745,011 A | 4/1998 | Scott |
| 5,748,185 A | 5/1998 | Stephan et al. |
| 5,757,368 A | 5/1998 | Gerpheide et al. |
| 5,763,909 A | 6/1998 | Mead et al. |
| 5,767,457 A | 6/1998 | Gerpheide et al. |
| 5,796,183 A | 8/1998 | Hourmand |
| 5,812,698 A | 9/1998 | Platt et al. |
| 5,841,078 A | 11/1998 | Miller et al. |
| 5,844,265 A | 12/1998 | Mead et al. |
| 5,854,625 A | 12/1998 | Frisch et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,880,411 A | 3/1999 | Gillespie et al. |
| 5,889,236 A | 3/1999 | Gillespie et al. |
| 5,889,936 A | 3/1999 | Chan |
| 5,914,465 A | 6/1999 | Allen et al. |
| 5,914,708 A | 6/1999 | LaGrange et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,969,513 A | 10/1999 | Clark |
| 6,023,422 A | 2/2000 | Allen et al. |
| 6,028,271 A | 2/2000 | Gillespie et al. |
| 6,028,959 A | 2/2000 | Wang et al. |
| 6,037,930 A | 3/2000 | Wolfe et al. |
| 6,097,432 A | 8/2000 | Mead et al. |
| 6,140,853 A | 10/2000 | Lo |
| 6,148,104 A | 11/2000 | Wang et al. |
| 6,185,450 B1 | 2/2001 | Seguine et al. |
| 6,188,228 B1 | 2/2001 | Philipp |
| 6,188,391 B1 | 2/2001 | Seely et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,271,835 B1 * | 8/2001 | Hoeksma .................. 345/168 |
| 6,280,391 B1 | 8/2001 | Olson et al. |
| 6,288,707 B1 | 9/2001 | Philipp |
| 6,295,052 B1 | 9/2001 | Kato et al. |
| 6,304,014 B1 | 10/2001 | England et al. |
| 6,310,611 B1 | 10/2001 | Caldwell |
| 6,320,184 B1 | 11/2001 | Winklhofer et al. |
| 6,320,282 B1 | 11/2001 | Caldwell |
| 6,323,846 B1 | 11/2001 | Westerman et al. |
| 6,326,859 B1 | 12/2001 | Goldman et al. |
| 6,338,109 B1 | 1/2002 | Snyder et al. |
| 6,377,009 B1 | 4/2002 | Philipp |
| 6,380,929 B1 | 4/2002 | Platt |
| 6,380,931 B1 | 4/2002 | Gillespie et al. |
| 6,414,671 B1 | 7/2002 | Gillespie et al. |
| 6,430,305 B1 | 8/2002 | Decker |
| 6,434,187 B1 | 8/2002 | Beard |
| 6,441,073 B1 | 8/2002 | Tanaka et al. |
| 6,452,514 B1 | 9/2002 | Philipp |
| 6,457,355 B1 | 10/2002 | Philipp |
| 6,466,036 B1 | 10/2002 | Philipp |
| 6,473,069 B1 | 10/2002 | Gerpheide |
| 6,489,899 B1 | 12/2002 | Ely et al. |
| 6,498,720 B2 | 12/2002 | Glad |
| 6,499,359 B1 | 12/2002 | Washeleski et al. |
| 6,507,214 B1 | 1/2003 | Snyder |
| 6,522,128 B1 | 2/2003 | Ely et al. |
| 6,523,416 B2 | 2/2003 | Takagi et al. |
| 6,525,593 B1 | 2/2003 | Mar |
| 6,534,970 B1 | 3/2003 | Ely et al. |
| 6,535,200 B2 | 3/2003 | Philipp |
| 6,542,025 B1 | 4/2003 | Kutz et al. |
| 6,563,391 B1 | 5/2003 | Mar |
| 6,570,557 B1 | 5/2003 | Westerman et al. |
| 6,587,093 B1 | 7/2003 | Shaw et al. |
| 6,603,330 B1 | 8/2003 | Snyder |
| 6,608,472 B1 | 8/2003 | Kutz et al. |
| 6,610,936 B2 | 8/2003 | Gillespie et al. |
| 6,611,220 B1 | 8/2003 | Snyder |
| 6,614,320 B1 | 9/2003 | Sullam et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,704,005 B2 | 3/2004 | Kato et al. |
| 6,705,511 B1 | 3/2004 | Dames et al. |
| 6,714,817 B2 | 3/2004 | Daynes et al. |
| 6,730,863 B1 | 5/2004 | Gerpheide |
| 6,750,852 B2 | 6/2004 | Gillespie et al. |
| 6,765,407 B1 | 7/2004 | Snyder |
| 6,774,644 B2 | 8/2004 | Eberlein |
| 6,784,821 B1 | 8/2004 | Lee |
| 6,788,221 B1 | 9/2004 | Ely et al. |
| 6,788,521 B2 | 9/2004 | Nishi |
| 6,798,218 B2 | 9/2004 | Kasperkovitz |
| 6,798,299 B1 | 9/2004 | Mar et al. |
| 6,809,275 B1 | 10/2004 | Cheng et al. |
| 6,823,282 B1 | 11/2004 | Snyder |
| 6,825,689 B1 | 11/2004 | Snyder |
| 6,825,890 B2 | 11/2004 | Matsufusa |
| 6,847,706 B2 | 1/2005 | Bozorgui-Nesbat |
| 6,854,067 B1 | 2/2005 | Kutz et al. |
| 6,856,433 B2 | 2/2005 | Hatano et al. |
| 6,859,884 B1 | 2/2005 | Sullam |
| 6,868,500 B1 | 3/2005 | Kutz et al. |
| 6,873,203 B1 | 3/2005 | Latham, II et al. |
| 6,888,538 B2 | 5/2005 | Ely et al. |
| 6,892,310 B1 | 5/2005 | Kutz et al. |
| 6,892,322 B1 | 5/2005 | Snyder |
| 6,893,724 B2 | 5/2005 | Lin et al. |
| 6,898,703 B1 | 5/2005 | Ogami et al. |
| 6,901,563 B1 | 5/2005 | Ogami et al. |
| 6,903,402 B2 | 6/2005 | Miyazawa |
| 6,904,570 B2 | 6/2005 | Foote et al. |
| 6,910,126 B1 | 6/2005 | Mar et al. |
| 6,949,811 B2 | 9/2005 | Miyazawa |
| 6,950,954 B1 | 9/2005 | Sullam et al. |
| 6,952,778 B1 | 10/2005 | Snyder |
| 6,957,242 B1 | 10/2005 | Snyder |
| 6,967,511 B1 | 11/2005 | Sullam |
| 6,969,978 B2 | 11/2005 | Dening |

| | | |
|---|---|---|
| 6,975,123 B1 | 12/2005 | Malang et al. |
| 6,981,090 B1 | 12/2005 | Kutz et al. |
| 7,002,557 B2 | 2/2006 | Iizuka et al. |
| 7,005,933 B1 | 2/2006 | Shutt |
| 7,023,257 B1 | 4/2006 | Sullam |
| 7,030,782 B2 | 4/2006 | Ely et al. |
| 7,030,860 B1 | 4/2006 | Hsu et al. |
| 7,086,014 B1 | 8/2006 | Bartz et al. |
| 7,092,980 B1 | 8/2006 | Mar et al. |
| 7,103,108 B1 | 9/2006 | Beard |
| 7,109,978 B2 | 9/2006 | Gillespie et al. |
| 7,119,550 B2 | 10/2006 | Kitano et al. |
| 7,127,630 B1 | 10/2006 | Snyder |
| 7,133,140 B2 | 11/2006 | Lukacs et al. |
| 7,133,793 B2 | 11/2006 | Ely et al. |
| 7,141,968 B2 | 11/2006 | Hibbs et al. |
| 7,141,987 B2 | 11/2006 | Hibbs et al. |
| 7,149,316 B1 | 12/2006 | Kutz et al. |
| 7,150,002 B1 | 12/2006 | Anderson et al. |
| 7,151,528 B2 | 12/2006 | Taylor et al. |
| 7,180,342 B1 | 2/2007 | Shutt et al. |
| 7,185,162 B1 | 2/2007 | Snyder |
| 7,185,321 B1 | 2/2007 | Roe et al. |
| 7,202,857 B2 | 4/2007 | Hinckley et al. |
| 7,212,189 B2 | 5/2007 | Shaw |
| 7,221,187 B1 | 5/2007 | Snyder et al. |
| 7,283,151 B2 | 10/2007 | Nihei et al. |
| 7,288,977 B2 | 10/2007 | Stanley |
| 7,298,124 B2 | 11/2007 | Kan et al. |
| 7,386,740 B2 | 6/2008 | Kutz et al. |
| 7,406,674 B1 | 7/2008 | Ogami et al. |
| 7,466,307 B2 | 12/2008 | Trent et al. |
| 7,663,607 B2 | 2/2010 | Hotelling et al. |
| 7,760,187 B2 | 7/2010 | Kennedy |
| 2002/0000978 A1* | 1/2002 | Gerpheide ............ 345/173 |
| 2002/0063688 A1 | 5/2002 | Shaw et al. |
| 2002/0121679 A1 | 9/2002 | Bazarjani et al. |
| 2002/0136371 A1 | 9/2002 | Bozorgui-Nesbat |
| 2002/0191029 A1 | 12/2002 | Gillespie et al. |
| 2003/0014239 A1 | 1/2003 | Ichbiah et al. |
| 2003/0062889 A1 | 4/2003 | Ely et al. |
| 2003/0080755 A1 | 5/2003 | Kobayashi |
| 2004/0252109 A1* | 12/2004 | Trent et al. ............ 345/174 |
| 2005/0024341 A1 | 2/2005 | Gillespie et al. |
| 2005/0035956 A1* | 2/2005 | Sinclair et al. ......... 345/184 |
| 2005/0062732 A1* | 3/2005 | Sinclair et al. ......... 345/184 |
| 2005/0088417 A1 | 4/2005 | Mulligan |
| 2005/0179668 A1 | 8/2005 | Edwards |
| 2006/0026535 A1* | 2/2006 | Hotelling et al. ........ 715/863 |
| 2006/0033724 A1* | 2/2006 | Chaudhri et al. ........ 345/173 |
| 2006/0053387 A1* | 3/2006 | Ording .................. 715/773 |
| 2006/0066582 A1 | 3/2006 | Lyon et al. |
| 2006/0097991 A1 | 5/2006 | Hotelling et al. |
| 2006/0258390 A1* | 11/2006 | Cui et al. ................ 455/550.1 |
| 2006/0273804 A1 | 12/2006 | Delorme |
| 2006/0290678 A1* | 12/2006 | Lii ....................... 345/173 |
| 2007/0152983 A1* | 7/2007 | McKillop et al. ........ 345/173 |
| 2007/0176903 A1* | 8/2007 | Dahlin et al. ........... 345/169 |
| 2007/0273660 A1 | 11/2007 | XiaoPing et al. |
| 2008/0001926 A1 | 1/2008 | XiaoPing et al. |
| 2008/0266263 A1 | 10/2008 | Motaparti et al. |

OTHER PUBLICATIONS

Seguine, Ryan; Lee, Mark; "Layout Guidelines for PSoC™ CapSense™", AN2292 Application Note, Revision B, Oct. 31, 2005, Cypress Perform, pp. 1-15.

Seguine, Dennis; "Capacitive Switch Scan", AN2233a Application Note, Revision B, Apr. 14, 2005, Cypress Perform, pp. 1-6.

USPTO Non-Final Rejection for U.S. Appl. No. 11/442,212 dated Mar. 31, 2009; 12 pages.

U.S. Appl. No. 11/442,212: "Mulit-function slider in touchpad," XiaoPing; filed May 26, 2006; 57 pages.

USPTO Non-Final Rejection for U.S. Appl. No. 11/480,016 dated Apr. 10, 2009; 14 pages.

U.S. Appl. No. 11/480,016: "Bidirectional Slider," XiaoPing et al.; filed Jun. 29, 2006; 58 pages.

Hal Philipp, "Charge Transfer Sensing," Spread Spectrum Sensor Technology Blazes New Applications, 1997, 9 pages.

Adam Chapweske, "The PS/2 Mouse Interface," PS/2 Mouse Interfacing, 2001, 11 pages.

USPTO Final Rejection for U.S. Appl. No. 11/442,212 dated Oct. 2, 2009; 12 pages.

USPTO Advisory Action for U.S. Appl. No. 11/442,212 dated Dec. 17, 2009; 3 pages.

USPTO Non-Final Rejection for U.S. Appl. No. 11/442,212 dated Jul. 6, 2010; 13 pages.

USPTO Final Rejection for U.S. Appl. No. 11/442,212 dated Oct. 13, 2010; 13 pages.

USPTO Final Rejection for U.S. Appl. No. 11/480,016 dated Nov. 19, 2009; 16 pages.

USPTO Advisory Action for U.S. Appl. No. 11/480,016 dated Jan. 29, 2010; 3 pages.

USPTO Non-Final Rejection for U.S. Appl. No. 11/480,016 dated Mar. 17, 2010; 17 pages.

USPTO Final Rejection for U.S. Appl. No. 11/480,016 dated Aug. 31, 2010; 19 pages.

USPTO Advisory Action for U.S. Appl. No. 11/480,016 dated Nov. 10, 2010; 3 pages.

Sedra et al., "Microelectronic Circuits," 3rd Edition, 1991, Oxford University Press, Feb. 5, 2007; 20 pages.

Van Ess, David; "Simulating a 555 Timer with PSoC," Cypress Semiconductor Corporation, Application Note AN2286, May 19, 2005; 10 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "CY8C21x34 Data Sheet," CSR User Module, CSR V.1.0; Oct. 6, 2005; 36 pages.

Chapweske, Adam; "The PS/2 Mouse Interface," PS/2 Mouse Interfacing, 2001, retrieved on May 18, 2006; 11 pages.

USPTO Non-Final Rejection for U.S. Appl. No. 11/442,212 dated Feb. 25, 2011; 13 pages.

USPTO Advisory Action for U.S. Appl. No. 11/442,212 dated Jan. 5, 2011; 3 pages.

USPTO Non-Final Rejection for U.S. Appl. No. 11/480,016 dated Jan. 26, 2011; 22 pages.

USPTO Notice of Allowance for U.S. Appl. No. 10/238,966 dated Jan. 27, 2009; 4 pages.

USPTO Non-Final Rejection for U.S. Appl. No. 10/238,966 dated Jun. 30, 2008; 12 pages.

USPTO Non-Final Rejection for U.S. Appl. No. 10/238,966 dated Dec. 26, 2007; 12 pages.

USPTO Final Rejection for U.S. Appl. No. 10/238,966 dated Sep. 27, 2007; 9 pages.

USPTO Non-Final Rejection for U.S. Appl. No. 10/238,966 dated Apr. 19, 2007; 7 pages.

USPTO Non-Final Rejection for U.S. Appl. No. 10/238,966 dated Oct. 20, 2006; 8 pages.

USPTO Non-Final Rejection for U.S. Appl. No. 10/238,966 dated Apr. 6, 2006; 8 pages.

USPTO Notice of Allowance for U.S. Appl. No. 10/033,027 dated Mar. 31, 2009; 7 pages.

USPTO Non-Final Rejection for U.S. Appl. No. 10/033,027 dated Dec. 18, 2008; 5 pages.

USPTO Final Rejection for U.S. Appl. No. 10/033,027 dated Jun. 8, 2007; 8 pages.

USPTO Non-Final Rejection for U.S. Appl. No. 10/033,027 dated Dec. 21, 2006; 31 pages.

USPTO Final Rejection for U.S. Appl. No. 10/033,027 dated Aug. 9, 2006; 6 pages.

USPTO Non-Final Rejection for U.S. Appl. No. 10/033,027 dated Apr. 26, 2006; 26 pages.

USPTO Final Rejection for U.S. Appl. No. 10/033,027 dated Oct. 31, 2005; 24 pages.

USPTO Non-Final Rejection for U.S. Appl. No. 10/033,027 dated Apr. 20, 2005; 20 pages.

USPTO Non-Final Rejection for U.S. Appl. No. 10/033,027 dated Oct. 18, 2004; 17 pages.

USPTO Non-Final Rejection for U.S. Appl. No. 10/001,478 dated Oct. 20, 2008; 18 pages.
USPTO Final Rejection for U.S. Appl. No. 10/001,478 dated Jun. 4, 2008; 18 pages.
USPTO Non-Final Rejection for U.S. Appl. No. 10/001,478 dated Jan. 30, 2008; 19 pages.
USPTO Final Rejection for U.S. Appl. No. 10/001,478 dated Sep. 17, 2007; 15 pages.
USPTO Non-Final Rejection for U.S. Appl. No. 10/001,478 dated Apr. 2, 2007; 17 pages.
USPTO Final Rejection for U.S. Appl. No. 10/001,478 dated Sep. 5, 2006; 19 pages.
USPTO Non-Final Rejection for U.S. Appl. No. 10/001,478 dated Mar. 15, 2006; 19 pages.
USPTO Final Rejection for U.S. Appl. No. 10/001,478 dated Oct. 24, 2005; 15 pages.
USPTO Non-Final Rejection for U.S. Appl. No. 10/001,478 dated May 16, 2005; 13 pages.
USPTO Notice of Allowance for U.S. Appl. No. 10/002,217 dated Jan. 28, 2009; 4 pages.
USPTO Notice of Allowance for U.S. Appl. No. 10/002,217 dated Oct. 14, 2008; 6 pages.
USPTO Notice of Allowance for U.S. Appl. No. 10/002,217 dated Jun. 6, 2008; 7 pages.
USPTO Final Rejection for U.S. Appl. No. 10/002,217 dated Feb. 6, 2008; 10 pages.
USPTO Non-Final Rejection for U.S. Appl. No. 10/002,217 dated Aug. 3, 2007; 10 pages.
USPTO Final Rejection for U.S. Appl. No. 10/002,217 dated Mar. 7, 2007; 12 pages.
USPTO Non-Final Rejection for U.S. Appl. No. 10/002,217 dated Oct. 2, 2006; 21 pages.
USPTO Non-Final Rejection for U.S. Appl. No. 10/002,217 dated Apr. 3, 2006; 12 pages.
USPTO Final Rejection for U.S. Appl. No. 10/002,217 dated Nov. 17, 2005; 17 pages.
USPTO Non-Final Rejection for U.S. Appl. No. 10/002,217 dated May 19, 2005; 15 pages.
USPTO Advisory Action for U.S. Appl. No. 10/001,477 dated Oct. 10, 2008; 3 pages.
"An Analog PPL-Based Clock and Data Recovery Circuit with High Input Jitter Tolerance," Sun, Reprinted from IEEE Journal of Solid-State Circuits, 1989; 4 pages.
"WP 3.5: An Integrated Time Reference," Blauschild, Digest of Technical Papers, 1994; 4 pages.
"Micropower CMOS Temperature Sensor with Digital Output," Bakker et al., IEEE Journal of Solid-State Circuits, 1996; 3 pages.
U.S. Appl. No. 09/964,991: "A Novel Band-Gap Circuit for Providing an Accurate Reference Voltage Compensated for Process State, Process Variations and Temperature," Kutz et al., filed on Sep. 26, 2001; 25 pages.
U.S. Appl. No. 09/842,966: "Precision Crystal Oscillator Circuit Used in Microcontroller," Monte Mar, filed on Apr. 25, 2001; 28 pages.

* cited by examiner

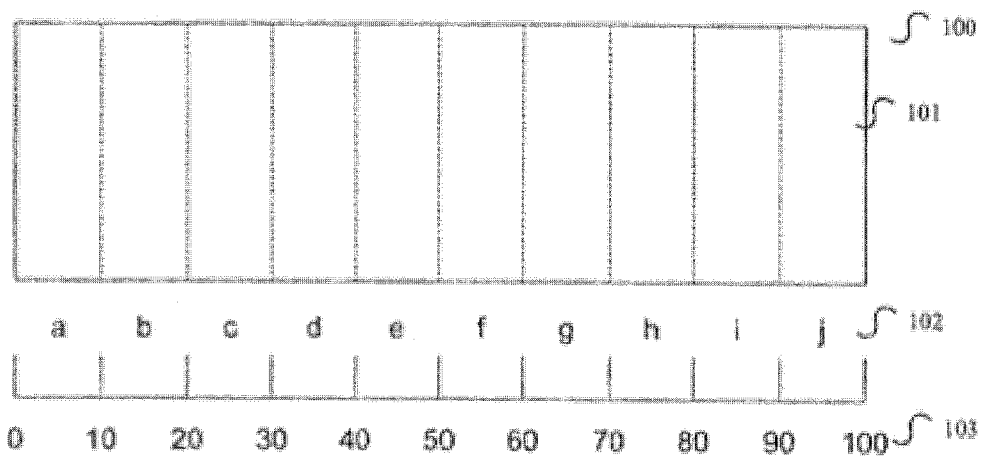
FIG. 1A   ---PRIOR ART---
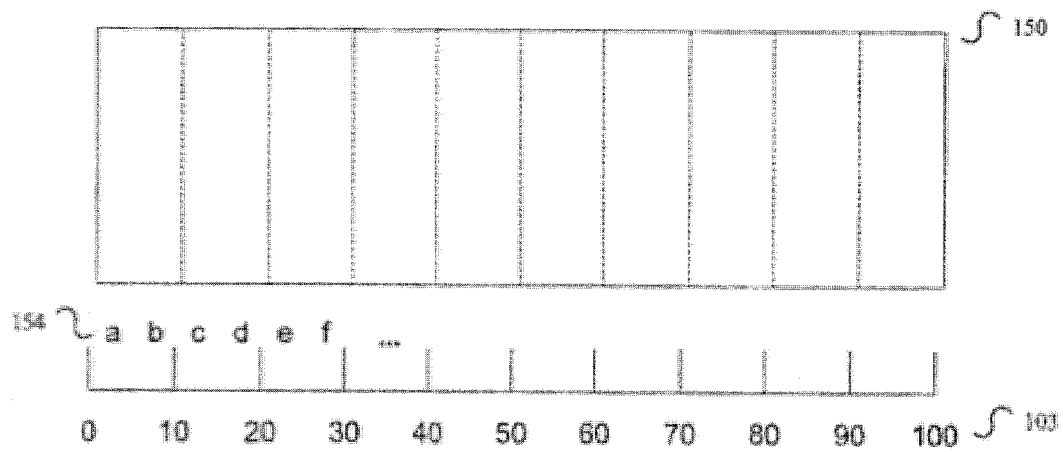
FIG. 1B   ---PRIOR ART---

TOP-VIEW of 2-Layer Touch-Sensor Pad 220

CROSS-SECTIONAL VIEW of 2-Layer Touch-Sensor Pad 220

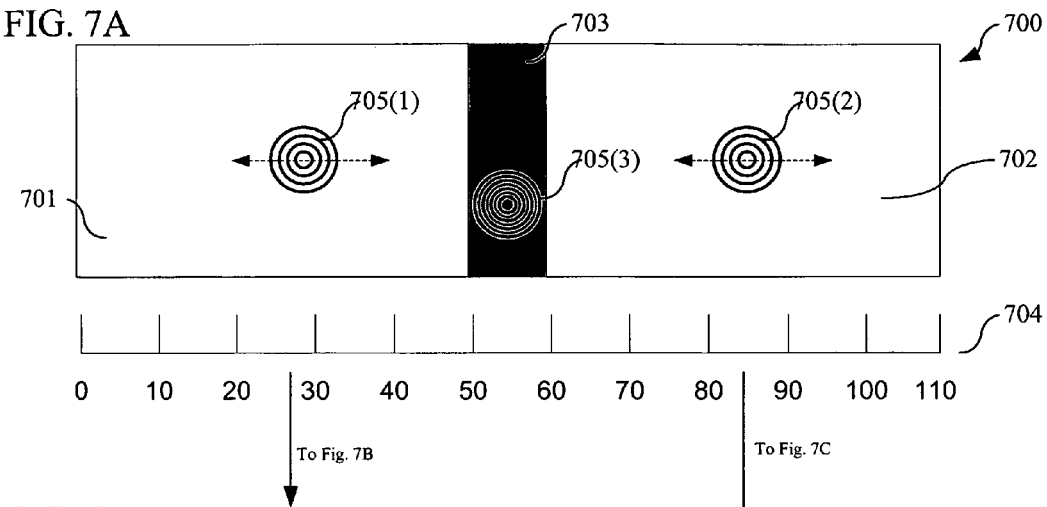
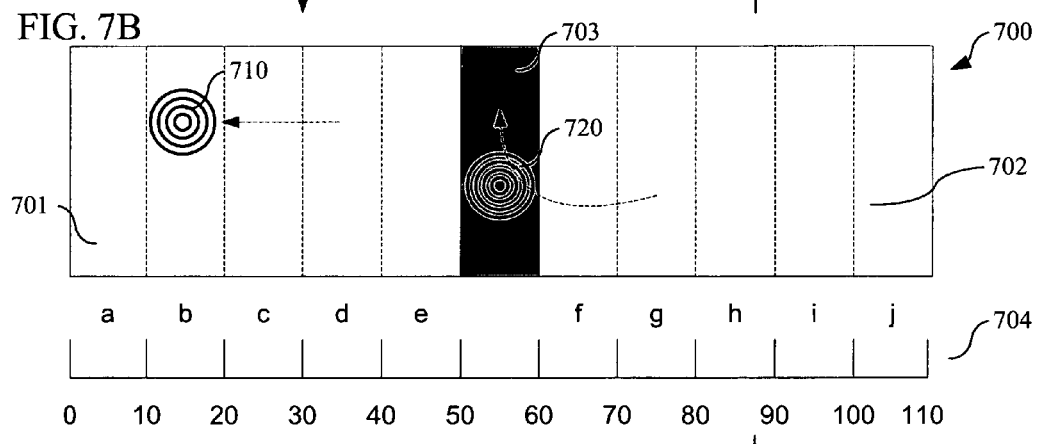
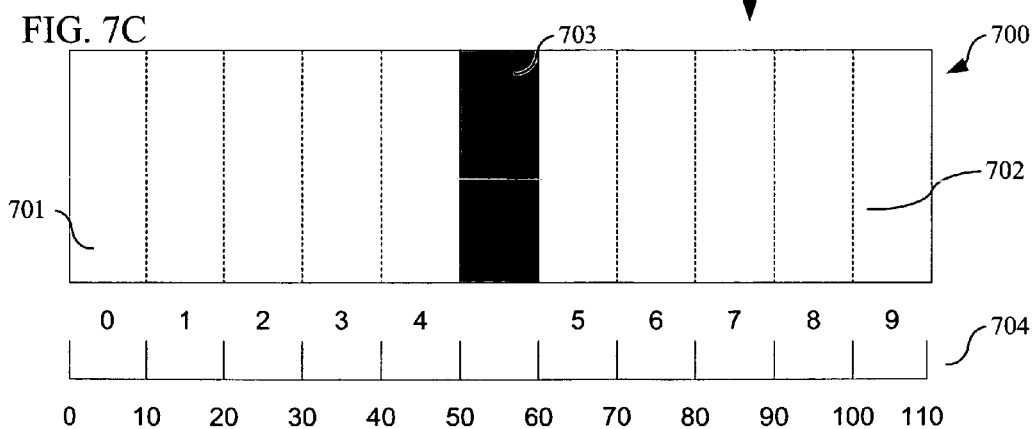

BIDIRECTIONAL SLIDER WITH DELETE FUNCTION

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads can include multi-dimensional sensor arrays. The sensor array may be one dimensional, detecting movement in one axis. The sensor array may also be two dimensional, detecting movements in two axes.

FIG. 1A illustrates a conventional touch sensing slider that is mapped to a set of characters. The touch-sensor slider pad 100 includes a sensing surface 101 on which a conductive object may be used to contact the sensing surface 101 to cause a mapped character 102 associated with the position of contact to be outputted to a display device (not shown). Touch-sensor slider pad 100 maps each output character to a resolution range 103 of the touchpad. A resolution range is defined as the slider resolution divided by the number of characters mapped to the slider. In the illustration of FIG. 1A, the resolution range for each character would be 10.

However, in order to provide more output options, conventional systems map additional characters 154 to a touch-sensor slider pad 150. FIG. 1B illustrates a touch-sensor slider pad 150 mapped to twice the number of output character 154. Assuming the resolution of touch-sensor slider pad 150 is the same as touch-sensor slider pad 100, the resultant resolution range per character is divided in half. Due to uncertain pressure of a conductive object, small movements of a conductive object and the compacted resolution range for each character, the precision of output characters cannot be ensured.

BRIEF DESCRIPTION OF THE DRAWINGS

The present invention is illustrated by way of example, and not by way of limitation, in the figures of the accompanying drawings.

FIG. 1A illustrates a conventional touch-sensor slider pad.
FIG. 1B illustrates a conventional touch-sensor slider pad.

FIG. 7A illustrates a top-side view of an embodiment of a touch-sensor slider including a plurality of regions.
FIG. 7B illustrates a top-side view of an embodiment of a touch-sensor slider mapped to a first subset of objects.
FIG. 7C illustrates a top-side view of an embodiment of a touch-sensor slider mapped to a second subset of objects

DETAILED DESCRIPTION

The following detailed description includes circuits, which will be described below. Alternatively, the operations of the circuits may be performed by a combination of hardware, firmware, and software. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses.

A method and apparatus for a bi-directional slider with function of deletion is described. In one embodiment, a first set of output objects is mapped into a plurality of one dimensional positions of a touch sensing device when a presence of a conductive object is determined to be in a first region of a touch sensing device. A second set of output objects is mapped into the plurality of one dimensional positions of the touch sensing device when the presence of the conductive object is determined to be in a second region, which is distinct form the first region. In one embodiment, a function is processed when the presence of the conductive object is determined to be in a third region of the touch sensing device, distinct from the first and second regions.

In one embodiment, as a conductive object moves across the plurality of one dimensional positions of the touch sensing device, data is received that is indicative of movement of the conductive object across the plurality of one dimensional positions of the touch sensing device. When the conductive object moves off the touch sensing device, a one dimensional position where the conductive object moves off the touch sensing device is determined. Based on the determined one dimensional position where the conductive object moved off the touch sensing device, an output object is outputted by a processing device, each output object mapped to a one dimensional position of the first and second regions of the touch sensing device. However, the current mapping of output objects is cancelled when the conductive object moves off the third region of the touch sensing device. Furthermore, upon detecting data indicative of a tap, from a conductive object, on the third region, a previously outputted object is deleted.

Figure 2:
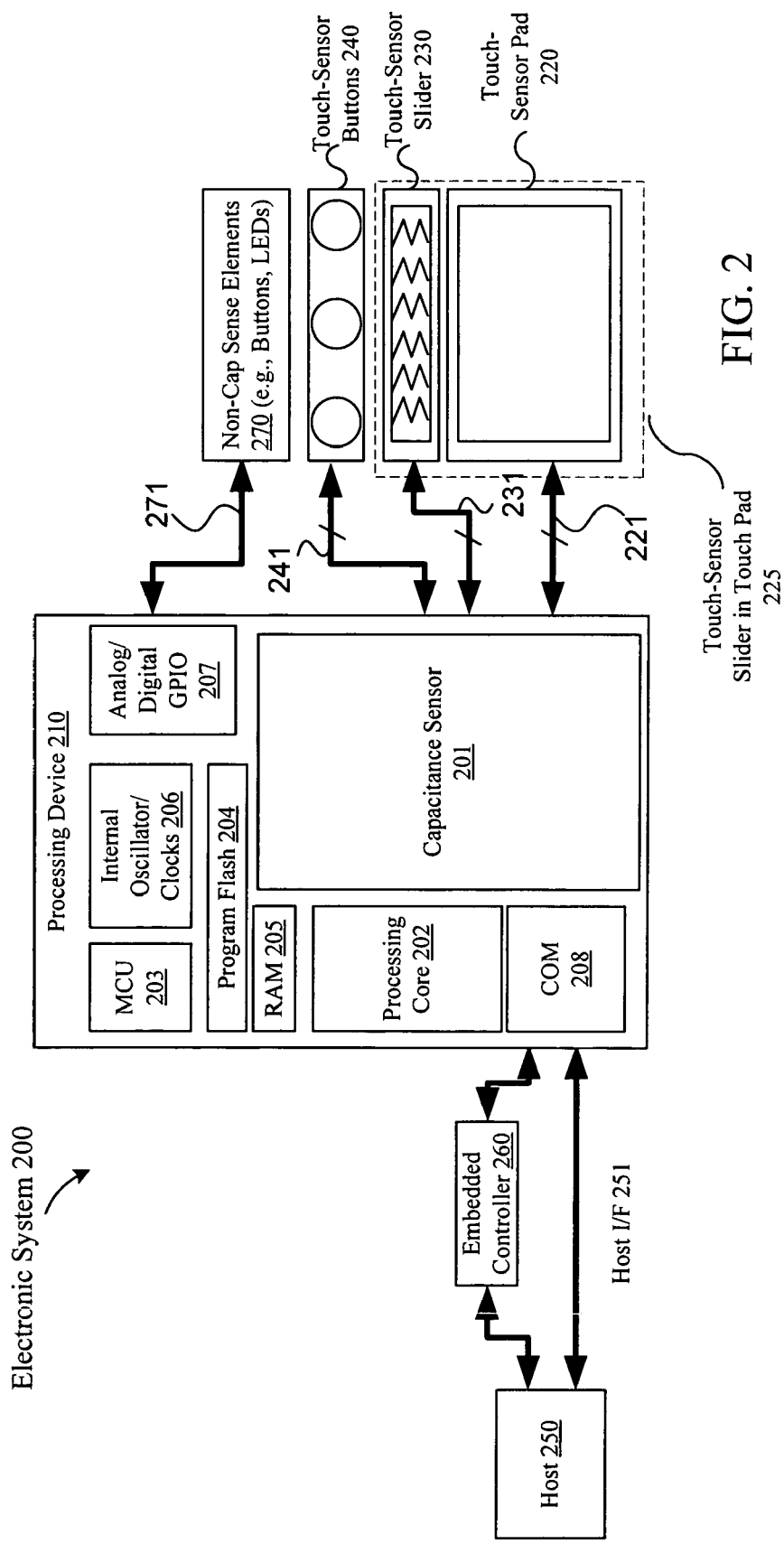
FIG. 2 illustrates a block diagram of one embodiment of an electronic system having a processing device for detecting presence of a conductive object.

FIG. 2 illustrates a block diagram of one embodiment of an electronic system having a processing device for detecting presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnection between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, a touch-slider 230, or a touch-sensor 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. Whereas a touch-sensor pad 220 is a sensing device having a multiple row/column array of sensing elements, a touch-sensor slider 230 is a one-dimensional touch sensing device. The touch-sensor slider 230 does not convey the absolute position of a conductive object (e.g., to emulate a mouse in controlling cursor positioning on a display), but, rather, used to actuate one or more functions associated with particular sensing elements of the touch-sensor slider 230.

In one embodiment, a combined touch-sensor slider and touch-sensor pad are referred to collectively as touch-sensor slider in touchpad 225. Touch-sensor slider in touchpad 225 is a sensing device comprising a multi-dimensional sensor array. A first area of touch sensor slider in touchpad 225 is a subset of the multidimensional sensor array of touch sensor slider in touchpad 225, corresponding to a multi-dimensional array of sensing elements for a touch sensor pad. A second area of touch sensor slider in touchpad 225 is a subset of the multidimensional sensor array of touch sensor slider in touchpad 225, corresponding to a one-dimensional array of sensing elements utilized as sensing elements for a touch sensor slider. In one embodiment, the first and second areas of touch sensor slider in touchpad 225 are distinct from each other.

In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-add functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206, and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interface (SPI). The embedded controller 260 and/or embedded controller 260 may be coupled to the processing device 210 with a ribbon or flex cable from an assembly, which houses the touch-sensor pad and processing device.

In one embodiment, the processing device 210 is configured to communicate with the embedded controller 260 or the host 250 to send data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be other one or more processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider or, charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
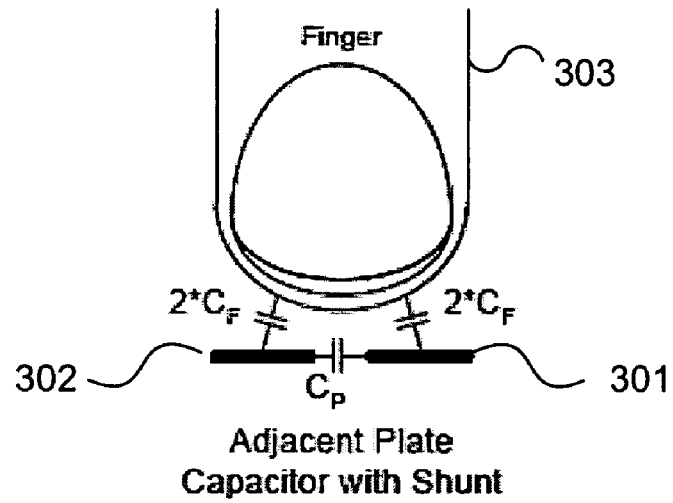
FIG. 3A illustrates a varying switch capacitance.
Figure 3B:
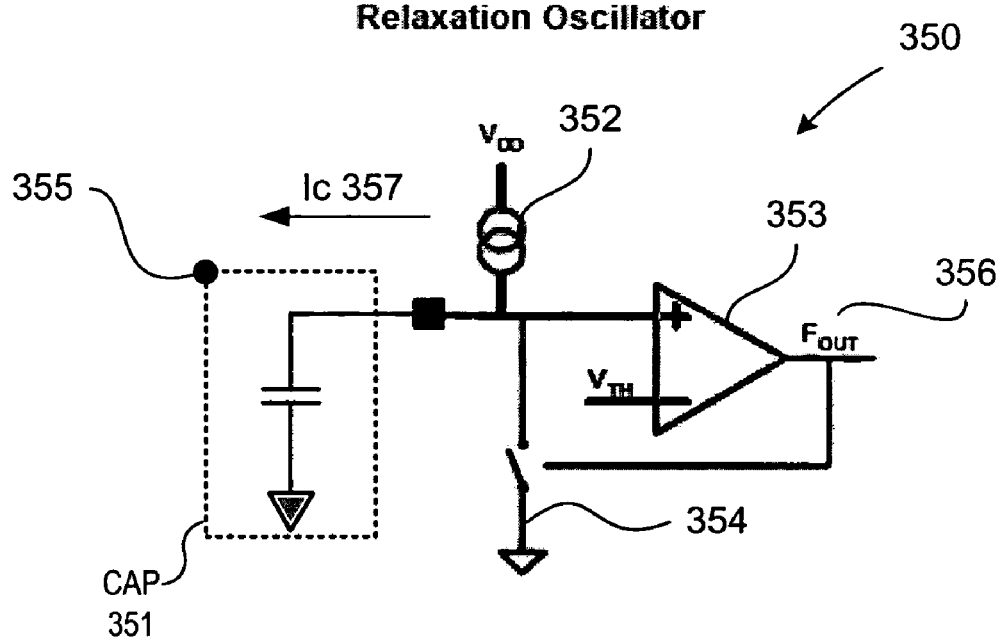
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (Cf). Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV = I_c dt \quad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance $\Delta C$ can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta cf = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a sigal indicative of the difference $\Delta f$ between these frequencies. By monitoring $\Delta f$ one can determine whether the capacitance of the capacitor 351 has changed.

In one exemplary embodiment, the relaxation oscillator 350 may be built using a 555 timer to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
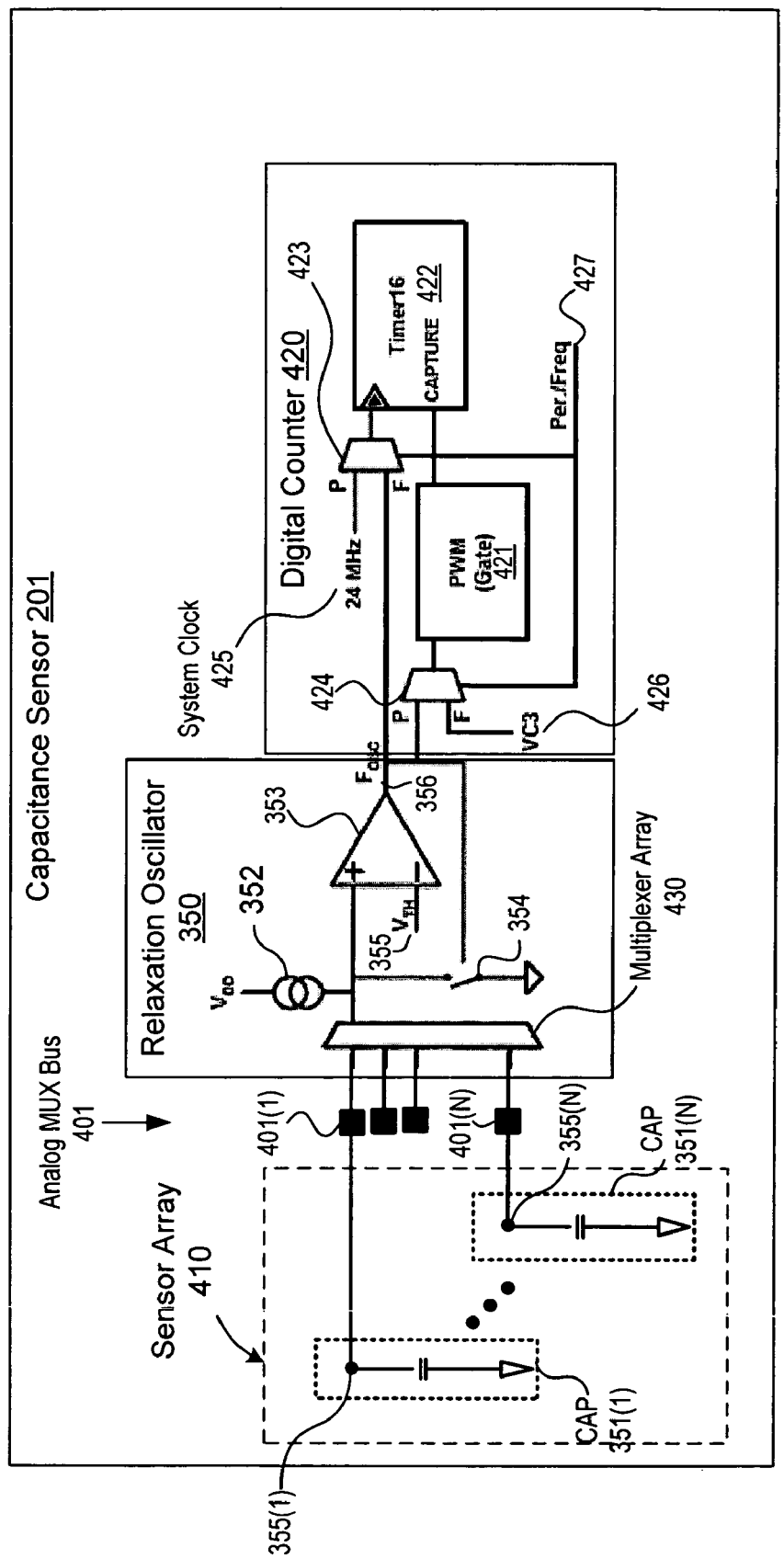
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231).

Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP1O port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from $C_P$ to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from the 24 MHz system clock 425). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software load and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \quad (4)$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \quad (5)$$

Adding some margin to yield 2500 counts, and running the frequency measurement method at 1.0 MHz, the detection time for the switch is 4 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \quad (6)$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent PCB pads or traces, as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \qquad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger, or other conductive object, position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \qquad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
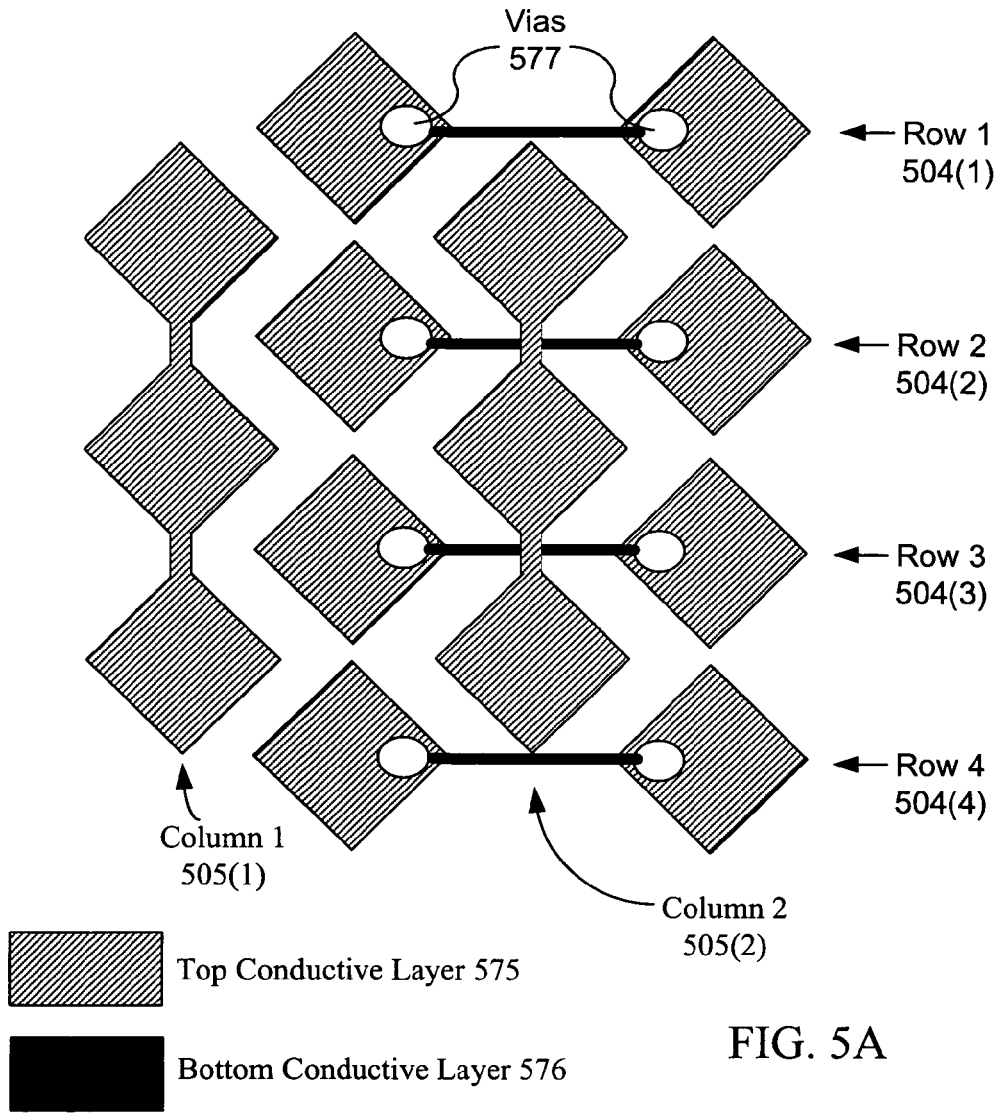
FIG. 5A illustrates a top-side view of one embodiment of a two-layer touch-sensor pad.
Figure 5B:
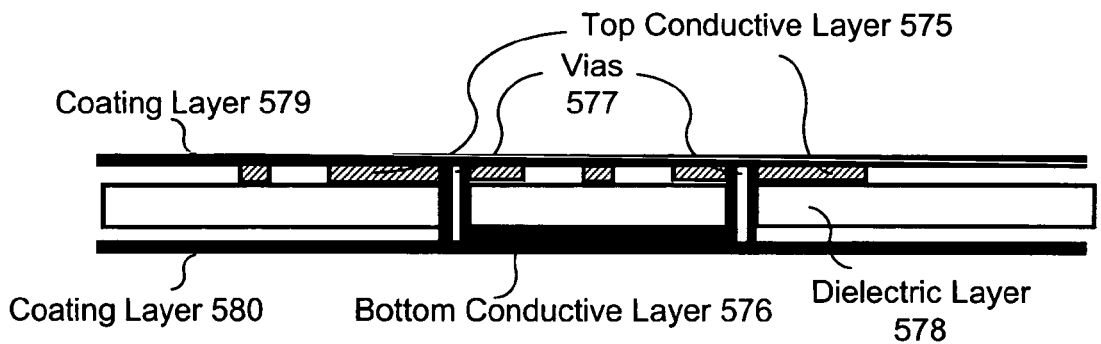
FIG. 5B illustrates a side view of one embodiment of the two-layer touch-sensor pad of FIG. 5A.

FIGS. 5A and 5B illustrate top-side and side views of one embodiment of a two-layer touch-sensor pad. Touch-sensor pad, as illustrated in FIGS. 5A and 5B, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5B, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 589 are applied to the surfaces opposite to the surfaces that are coupled to the dielectric layer 578 on both the top and bottom conductive layers 575 and 576.

It should be noted that the present embodiments should not be limited to connecting the sensor elements of the rows using vias to the bottom conductive layer 576, but may include connecting the sensor elements of the columns using vias to the bottom conductive layer 576.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6:
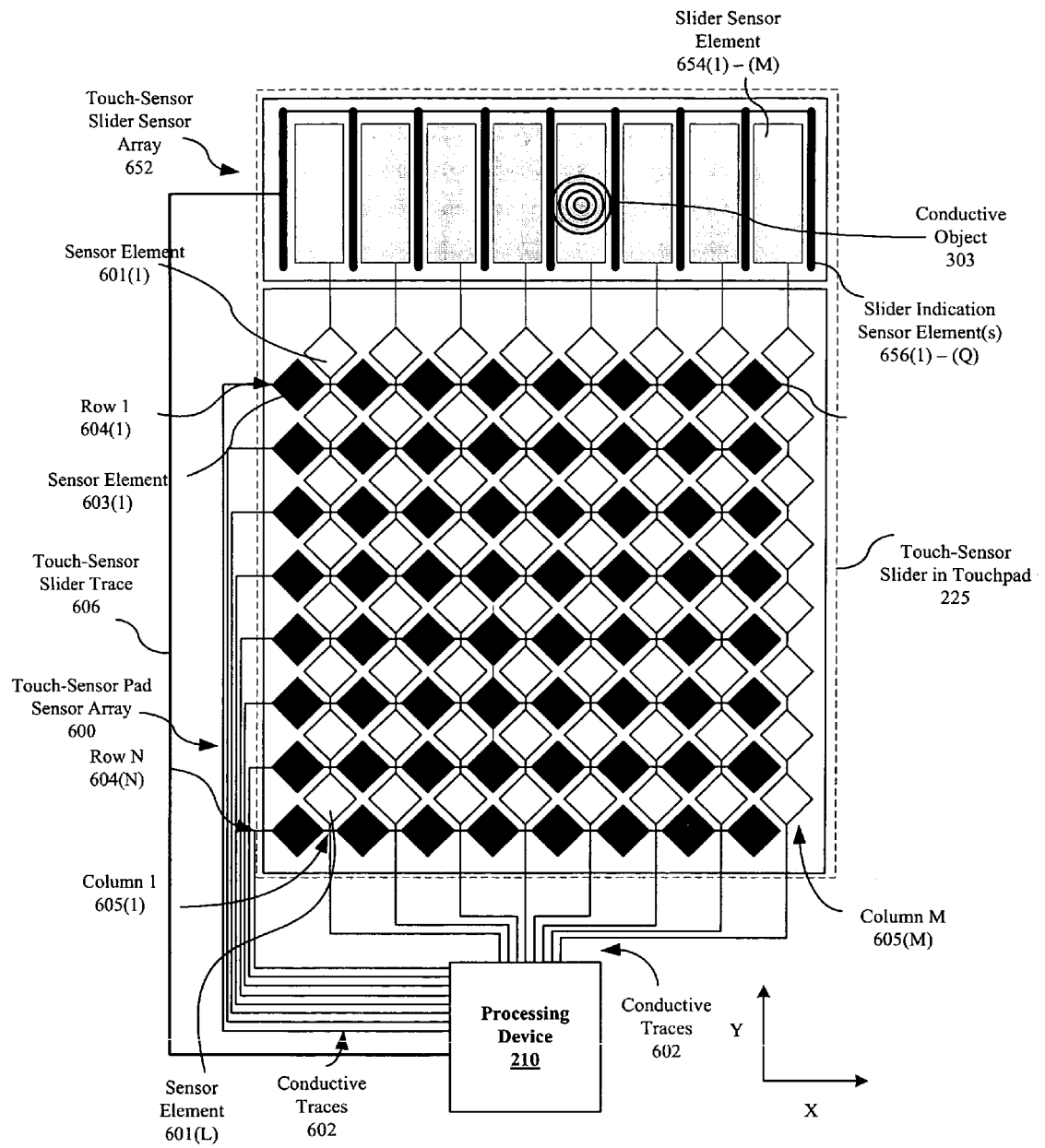
FIG. 6 illustrates a top-side view of an embodiment of a sensor array having a plurality of sensor elements for detecting a presence of a conductive object on the touch sensor slider of a touch-sensor pad.

FIG. 6 illustrates a top-side view of an embodiment of a touch-sensor slider in touchpad 225 having a plurality of sensor elements for detecting a presence of a conductive object 303. In one embodiment, a sensor array of sensor elements of touch-sensor slider in touchpad 225 is a combination of touch-sensor slider sensor array 652 and touch-sensor pad sensor array 600.

Touch-sensor sensor slider in touchpad 225 includes a first area comprising touch-sensor pad sensor array 600. Touch sensor pad sensor array 600 includes a plurality of rows 604(1)-604(N) and a plurality of columns 605(1)-605(M), where N is a positive integer value representative of the number of rows and M is a positive integer value representative of the number of columns. Each row includes a plurality of sensor elements 603(1)-603(K), where K is a positive integer value representative of the number of sensor elements in the row. Each column includes a plurality of sensor elements 601(1)-601(L), where L is a positive integer value representative of the number of sensor elements in the column. Accordingly, touch-sensor pad sensor array 600 is an N×M sensor matrix. The N×M sensor matrix, in conjunction with the processing device 210, is configured to detect a position of a presence of the conductive object 303 in the x-, and y-directions.

Alternating columns in touch-sensor pad sensor array 600 correspond to x- and y-axis elements. The y-axis sensor elements 603(1)-603(K) are illustrated as black diamonds in FIG. 6, and the x-axis sensor elements 601(1)-601(L) are illustrated as white diamonds in FIG. 6. It should be noted that other shapes may be used for the sensor elements. In another embodiment, the columns and row may include vertical and horizontal bars (e.g., rectangular shaped bars), however, this design may include additional layers in the PCB to allow the vertical and horizontal bars to be positioned on the PCB so that they are not in contact with one another.

Touch sensor slider in touch pad 225 further includes a second area comprising a touch-sensor slider sensor array 652 having a plurality of touch-sensor elements 654(1)-(M), shaped as rectangular bars, for detecting a one dimensional position of presence of a conductive object 303 on the touch-sensor slider sensor array 652. Other configurations and shapes of touch sensor slider sensing elements may be utilized, such as triangles, rhombi, circles, etc. As noted above, whereas the area defined by the touch sensor pad sensor array 600 conveys absolute positional information of a contact object, the area defined by the touch-sensor slider sensor array 652 is used to convey relative one-dimensional positioning information.

Touch-sensor slider sensor array 652 in touch-sensor slider in touchpad pad 225 includes a plurality of slider sensor elements 654(1)-(M), where M is a positive value representative of the number of columns, where sensor elements 654(1)-(M) shares the column conductive traces 602 of touch-sensor pad sensor array 600. Touch sensor slider sensor array 652 further includes slider indication sensor elements 656(1)-656(Q), where Q is a positive value, which is coupled to processing device 210 via touch-sensor slider trace 606. When processing device receives data from any of slider indication sensor elements 656(1)-656(Q), processing device efficiently determines, without having to compute x/y coordinates, that a conductive object is currently in contact with the area defining touch sensor slider sensing array 652. Accordingly, touch-sensor slider sensing array 652 is a 1×M sensor matrix whereas the area defined by touch-sensor pad sensor array 600 is an N×M matrix. The 1×M and N×M matrix are combined utilizing the column conductive traces 602 to form touch-sensor slider in touchpad 225. In conjunction with the processing device 210, touch-sensor slider in touchpad 225 is configured to detect a position of a presence of the conductive object 303 in a one-dimensional position when the presence of the conductive object 303 is detected in the area defined by the 1×M sensor matrix of the touch-sensor slider sensor array 652. The processing device is also configured to detect a position of a presence of the conductive object (not shown) in the x-, and y-directions when the presence of the conductive object is detected in the area defined by the N×M sensor matrix of the touch-sensor pad sensor array 600.

In one embodiment, processing device 210 utilizes conductive traces 602 for determining a one-dimensional position of conductive object 303 on the touch-sensor slider sensor array 652. Processing device 210 further utilizes touch sensor slider trace 606 to indicate whether a presence of a conductive object is determined to be in the area defined by touch-sensor slider sensor array 652. Beneficially, processing device 210 need not perform an x-y dimension comparison with a predefined region to determine that a presence of conductive object 303 is detected on the touch-sensor slider sensor array 652. Rather, processing device 210 efficiently detects the presence of conductive object 303 by receiving data from touch sensor conductive trace 606, and a one dimension position from column 654(1)-654(M). Furthermore, since touch-sensor slider sensor array 652 shares column traces with touch-sensor pad sensor array 600, additional conductive traces are not needed for determining one-dimensional positions of a conductive object on a slider. Furthermore, by utilizing the shared conductive traces 602 of the touch-sensor slider in touchpad 225, the number of pins added to processing device 210 to implement the touch-sensor slider in touchpad 225 is minimized while providing a feature rich touch-sensor slider 652, as described below.

FIG. 7A illustrates a top-side view of an embodiment of a touch-sensor slider including a plurality of regions. Touch-sensor slider 700 includes a first region 701, a second region 702, and a third region 703. In one embodiment, processing device 210 recognizes the regions of touch-sensor slider 700 in terms of predefined resolution ranges, corresponding to one-dimensional positions, for a resolution of a touch sensing slider. Resolution may be determined based on number of sensing elements in a touch-sensor slider, physical dimensions of the touch-sensor slider, etc. Processing device 210 utilizes a one-dimensional position where a presence of a conductive object is detected in a touch-sensor slider array (not shown) of touch-sensor slider pad in conjunction with the predefined resolution ranges, to determine in which region the presence is detected.

FIG. 7A represents one embodiment of an initial state of a touch-sensor slider, which will be analyzed by any of processing device 210, embedded controller 260, or host 250. Touch sensor slider 700 is conceptually divided into 3 resolution ranges of touch-sensor slider 700. Because a touch-sensing slider is composed of a plurality of one-dimensional positions, each resolution range is itself defined by a range of one-dimensional positions. Each resolution range need not be in proportion to the illustration of FIG. 7A, as any resolution range of acceptable size may be utilized in FIG. 7A. Different resolution ranges and touch-sensor slider pad resolutions, however, are applicable to the discussion below.

For example, supposing that a touch sensor slider is defined by total resolution from 0 to m. The first region 701 may occupy slider resolution range 0 to q, where resolution range 0 to q represents resolution range of a positive dimension (i.e., a resolution range of positive dimension denotes that the resolution range is non-empty). The second region 702 resolution range occupies resolution range r to m. The third region 703 occupies resolution range q to r, where 0<q<r<m. In one embodiment, as illustrated in FIG. 7A-7C, the resolution range for region one 701 might occupy ranges 0 to 50, region two might occupy 60 to 110, and region three might occupy 50 to 60 for a slider with resolution 110 (e.g., 0-110).

For ease of discussion, it will be assumed that touch-sensor slider pads illustrated by FIGS. 7A-7C, each include a total resolution of 110. Furthermore, the touch-sensor slider pads of FIGS. 7A-7C are initially divided into three resolution ranges with the first region 701 occupying resolution range 0-50, the second region 702 occupying resolution range 60-110, and the third region occupying resolution range 50-60. However, it will be apparent to one skilled in the art that any combination of resolution ranges may be utilized to divide a touch-sensor slider pad.

As noted above, processing device 210 utilizes one-dimensional positions to determine in which predefined resolution range a presence of a conductive object is first detected. When the presence of a conductive object, 705(1) or 705(2) is detected in either the first region 701 or the second region 702, processing device maps resolution ranges of touch-sensor slider pad 700 to subsets of output objects, as illustrated and described with respect to FIGS. 7B and 7C. In one embodiment, the output objects are output characters that are capable of being output to a display device. However, other output objects, such as sounds, pictures, applications may be mapped to resolution ranges.

When the presence of a conductive object 705(3) is determined to be in region three 703, processing device 210 processes a function. In one embodiment, if the presence 705(3) is indicative of a tap gesture, a previously outputted character is deleted from a display device (not shown). As such, when processing device 210 detects a tap in third region 703, the tap acts similarly to a delete key of a typical computing system. Although a tap within region 703 is described as deleting a previously outputted output character, with respect to FIG. 7A, a detected tap gesture in any third region 703 of FIGS. 7A-7C will cause a processing device to process a delete function. Beneficially the third region 703 allows for easy deletion of current output directly from touch-sensor slider 700.

When the presence of a conductive object 705(1) or 705(2) is determined to be in either the first region 701 or the second region 702 of the touch-sensor slider pad of FIG. 7A, processing device 210 maps a set of output characters to resolution ranges of the touch-sensor slider pad 700. If the presence 705(1) is determined to be in the first region 701, the processing device 210 maps a first set of output characters to touch-sensor slider pad 700, as illustrated in FIG. 7B. After touch sensor slider pad 700 is mapped to the first set of output characters, the touch sensor slider pad 700 of FIG. 7B acts as a data entry device.

Processing device 210 detects movement of a conductive object across one-dimensional positions of a touch-sensor slider of touch-sensor slider 700. When processing device 210 detects the presence of a conductive object 710 leaving the touch-sensor slider 700, processing device 210 matches the one-dimensional position corresponding to the resolution range where the conductive object 710 moved off of the touch-sensor slider 700. Processing device 210 then matches the determined resolution range of the detected one-dimensional position with the character mapped to the determined resolution range. This character may then be outputted to an output display device. In one embodiment, the character may be outputted to other output devices, such as a printer, memory, etc. In the example illustrated in FIG. 7B, when a conductive object moves off the touch-sensor slider pad 710 from a one-dimensional position corresponding to resolution range 10-20, a 'b' is outputted to a display device. After the output, the set out output characters will continue to be mapped to the resolution ranges of touch-sensor slider 700 allowing for continued character selection.

However, when processing device 210 detects movement of a presence 720 of a conductive object 710 that leaves the touch-sensor slider 700 from the third region 703, processing device 210 processes a function. In one embodiment, the function is a map-cancellation function. As a result, upon detecting a conductive object which moves of touch-sensor slider 700 from the third region, the current mapping is discarded and the touch-sensor slider 700 returns to the state illustrated in FIG. 7A.

From FIG. 7A, processing device again detects movement of a conductive object across one-dimensional positions of a touch-sensor slider of touch-sensor slider 700. When the presence 705(2) is determined to be in the second region 702, the processing device 210 maps a second set of output characters to touch-sensor slider 700, as illustrated in FIG. 7C. After touch sensor slider 700 is mapped to the second set of output characters, the touch sensor slider 700 of FIG. 7C behaves similarly to that described with respect to FIG. 7B.

Although specific examples have been provided with respect to output characters, resolution range values, and touch-sensor slider pad resolution, the examples are meant to provide an understanding of the present invention. According to FIGS. 7A-7C a slider beneficially acts as a data input device for a greater amount of objects without being prone to the disadvantages of conventional systems. Furthermore, the touch-sensor slider pad includes its own deletion key.

Figure 8A:
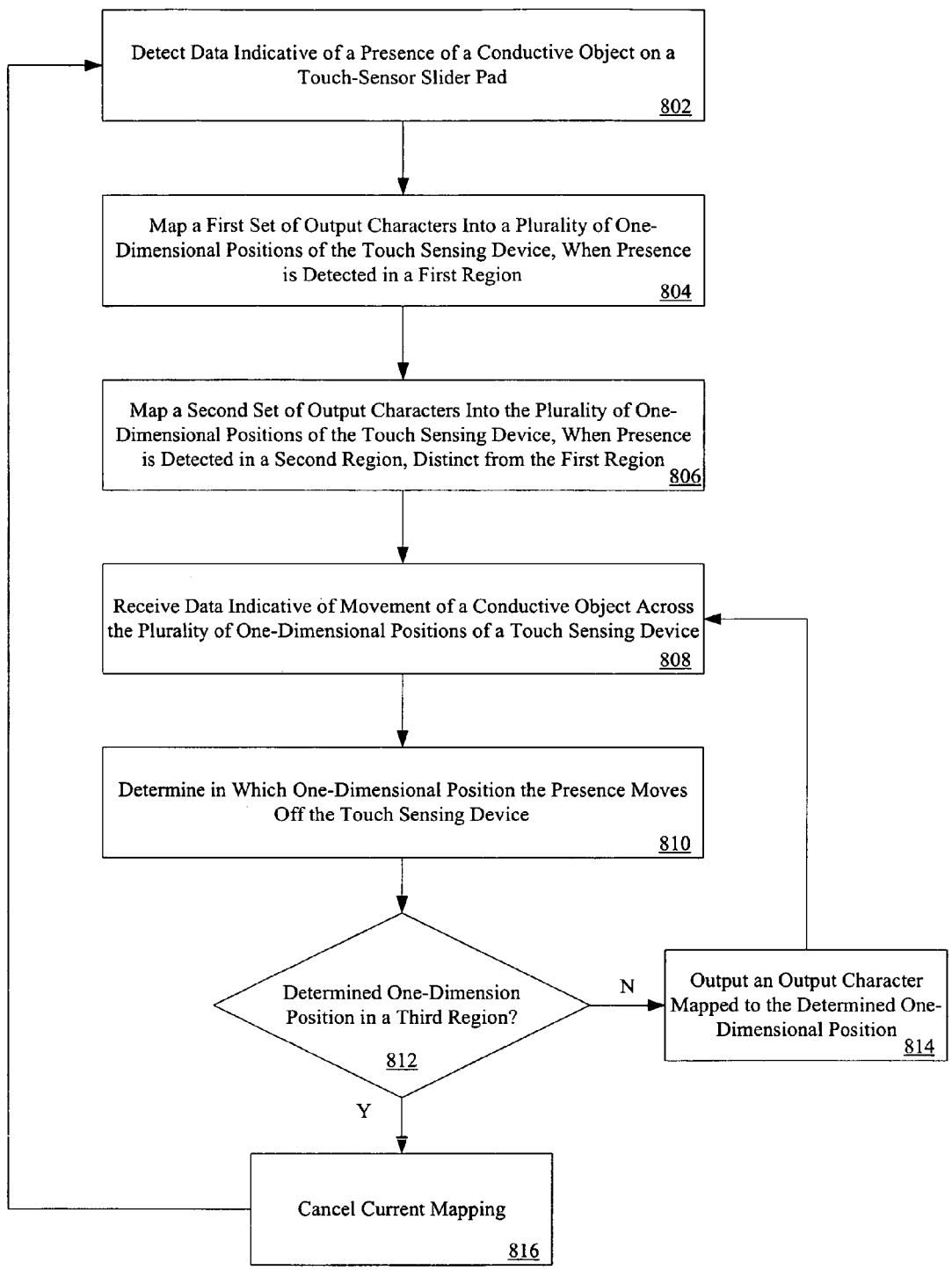
FIG. 8A illustrates one embodiment of a method for mapping a touch-sensor slider to two sets of output objects.

FIG. 8A illustrates one embodiment of a method for mapping a slider to two sets of output objects. The method may be employed by processing logic that may be embodied in hardware (circuitry, dedicated logic, etc.), software (such as is run on a general purpose computer system or a dedicated machine), or a combination of both. Furthermore, the hardware, software, or combination of both may be embedded in one or more of processing device 210, embedded controller 260, and host 250.

In this embodiment, the method begins when data indicative of a presence of a conductive object is detected by processing logic to be on a touch-sensor slider pad, step 802. As discussed above, a touch-sensor slider pad is a touch sensing device including a plurality of sensing elements which provide a processing device with a one-dimensional position of the conductive object among a plurality of one dimensional positions of the touch-sensor slider pad.

When processing logic first detects the presence in the first region, processing logic maps a first set of output objects into a plurality of one-dimensional positions of the touch sensing device, step 804. The one dimensional positions for each output character of the mapped output set correspond with a resolution range of the touch-sensor slider pad. If processing logic does not detect the presence in the first region, a second set of output objects is mapped by processing device into the plurality of one-dimensional positions of the touch sensing device, step 806. As a result, depending on where the presence is first detected by processing logic, first or second region, the appropriate set of output character is mapped to the touch-sensor slider.

Processing logic then receives data indicative of movement of a conductive object across the plurality of one-dimensional positions of the touch-sensor slider pad, i.e. the touch sensing device, step 808. When the conductive object moves off the touch-sensor slider pad, processing logic determines in which one-dimensional position the presence of the conductive object moved off the touch-sensor slider, step 810. If the determined one-dimensional position is a one dimensional position in a region, other than a third region of the touch sensing device, a character mapped to the position where the conductive device moved off the touch sensing pad is outputted to an output display device, step 814. As noted above, objects other than character may be mapped to one dimensional positions of a touch-sensor slider.

If processing logic does determine that the one-dimensional position where the conductive object moved off the touch sensing device is a one dimension position in the third region, processing logic cancels the current character mapping 816. After canceling the current character mapping, processing logic proceeds back to step 802 to await detecting a presence of a conductive object on a touch sensor slider pad.

Beneficially, the method of the current embodiment functions to map two sets of output characters to one touch-sensor slider. Because of the features of the method described above, the accuracy of slider output is maintained by preventing creating small resolution ranges where characters will be mapped. Furthermore, by including map-cancellation logic, a user using a touch-sensing device embodying the current method is provided a convenient way to switch between sets of output characters.

Figure 8B:
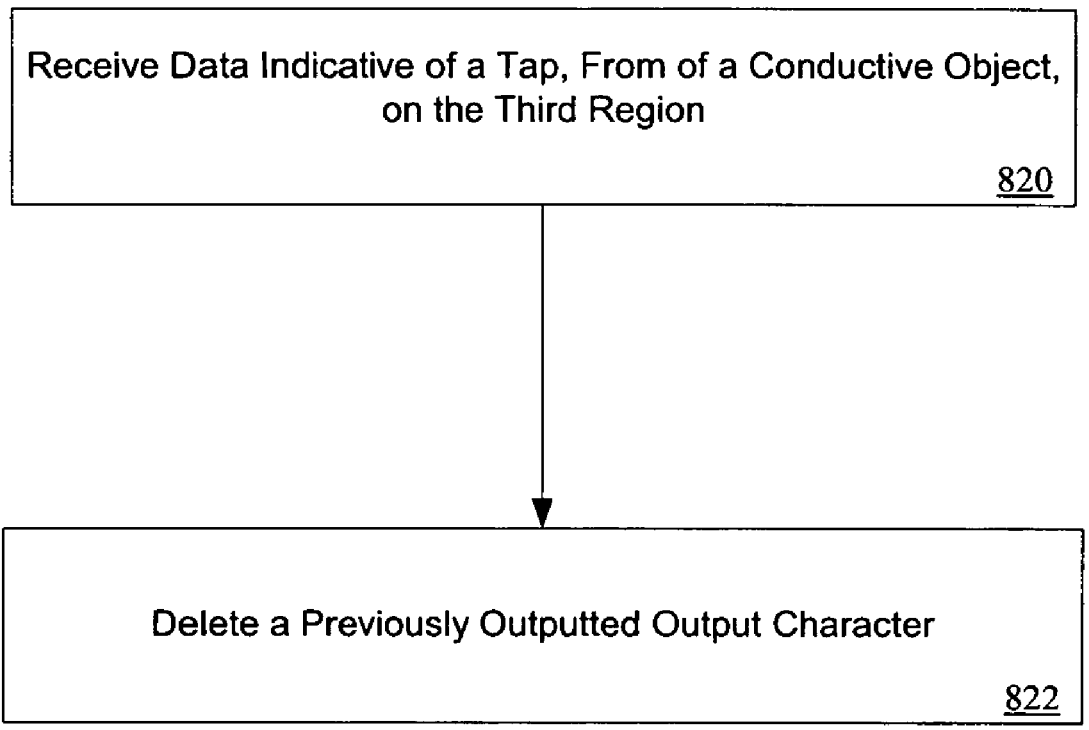
FIG. 8B illustrates one embodiment of a method for deleting output characters utilizing a touch-sensor slider.

FIG. 8B illustrates one embodiment of a method for deleting output characters utilizing a touch-sensor slider pad. The method may be employed by processing logic that may be embodied in hardware (circuitry, dedicated logic, etc.), software (such as is run on a general purpose computer system or a dedicated machine), or a combination of both. Furthermore, the hardware, software, or combination of both may be embedded in one or more of processing device 210, embedded controller 260, and host 250.

The method begins when processing logic detects data indicative of a tap, from a conductive object, on the third region of the touch sensor slider pad, step 820. Alternatively, other gestures such as a touch gesture could be utilized by a processing logic and touch sensing slider embodying the presently described method. Upon detecting a tap within the third region, processing logic causes the deletion of a previously outputted output character, step 822.

While some specific embodiments of the invention have been shown the invention is not to be limited to these embodiments. The invention is to be understood as not limited by the specific embodiments described herein, but only by scope of the appended claims.

What is claimed is:

1. A method, comprising:
mapping a first set of output objects into a plurality of relative one dimensional positions each having a resolution of a one-dimensional touch sensing device when a presence of a conductive object is determined to be in a first region, among a plurality of regions, of the touch sensing device; and
mapping a second set of output objects into the plurality of relative one dimensional positions each having at least the resolution of the touch sensing device when the presence of the conductive object is determined to be in a second region, distinct from the first region, of the touch sensing device,
wherein each of the first region and the second region of the touch sensing device comprises at least two of the plurality of relative one dimensional positions each having at least the resolution with one output object from each of the first set of output objects and the second set of output objects being mapped to one of the plurality of relative one dimensional positions, respectively.

2. The method of claim 1, further comprising:
processing a function when the presence of a conductive object is determined to be in a third region of the touch sensing device.

3. The method of claim 1, further comprising:
receiving data indicative of movement of the conductive object across the plurality of one dimensional positions of the touch sensing device;
determining a one dimensional position where the conductive object moves off the touch sensing device;
outputting an output object with a processing device based on the determined one dimensional position when the conductive object moves off a region of the touch sensing device, other than the third region, each output object mapped to a one dimensional position of the first and second regions of the touch sensing device; and
canceling the current mapping when the conductive object moves off the third region of the touch sensing device.

4. The method of claim 3, wherein receiving further comprises:
receiving data from a pin operatively coupled with the touch sensing device.

5. The method of claim 1, further comprises:
deleting a previously outputted output object upon detecting data indicative of a tap, from the conductive object, on the third region.

6. The method of claim 1, wherein the touch sensing device is a capacitive sensing device comprising a plurality of capacitive sensing elements.

7. The method of claim 6, wherein the plurality of capacitive sensing elements is formed by a plurality of conductive elements disposed below an insulating layer.

8. The method of claim 6, wherein the capacitive sensing device is a capacitive sensing slider.

9. The method of claim 1, wherein the conductive object is a finger.

10. The method of claim 1, wherein the output object is a character to be outputted to a display device.

11. An apparatus, comprising:
a one-dimensional touch sensing device having a plurality of regions comprising a first region and a second region distinct from the first region, each of the plurality of regions comprising a plurality of capacitive sensing elements, wherein the one-dimensional touch sensing device is a touch sensing slider; and a processing logic coupled with the touch sensing device, the processing logic to:
  map a first set of output objects into a plurality of one dimensional positions each having a resolution of the touch sensing device when a presence of a conductive object is determined to be in the first region; and
  map a second set of output objects into the plurality of one dimensional positions each having at least the resolution of the touch sensing device when the presence of the conductive object is determined to be in the second region, wherein each of the first region and the second region comprises at least two of the plurality of one dimensional positions each having at least the resolution with one output object from each of the first set of output objects and the second set of output objects being mapped to one of the plurality of one dimensional positions, respectively.

12. The apparatus of claim 11, further comprising:
the touch sensing device further comprising a third region distinct from the first region and the second region; and
the processing logic further to process a function when the presence of the conductive object is determined to be in the third region.

13. The apparatus of claim 12, wherein the function is a map cancellation function to cancel a current mapping applied to the touch sensing device.

14. The apparatus of claim 12, wherein the function is an output object deletion function when the presence of the conductive object is determined to be a tap in the third region.

15. The apparatus of claim 11, further comprising:
the processing logic to receive data indicative of movement of the conductive object across the plurality of positions of the touch sensing device, and to receive data indicative of a one dimensional position corresponding to where the conductive object moves off the touch sensing device; and an output device coupled with the processing logic to output an output object when the conductive object moves off the first region or the second region of the touch sensing device, each output object mapped to a one dimensional position of the first region and the second region of the touch sensing device associated with the output object.

16. The apparatus of claim 11, wherein the plurality of capacitive sensing elements is formed by a plurality of conductive pads disposed below an insulating layer.

17. The apparatus of claim 11, wherein the conductive object is a finger.

18. An apparatus comprising:
means for mapping a first set of output objects into a plurality of one dimensional positions each having a resolution of a one-dimensional touch sensing device when a presence of a conductive object is determined to be in a first region, among a plurality of regions, of the touch sensing device; and
means for mapping a second set of output objects into the plurality of one dimensional positions each having at least the resolution of the touch sensing device when the presence of the conductive object is determined to be in a second region, distinct from the first region, of the touch sensing device, wherein each of the first region and the second region of the touch sensing device comprises at least two of the plurality of one dimensional positions each having at least the resolution with one output object from each of the first set of output objects and the second set of output objects being mapped to one of the plurality of one dimensional positions, respectively.

19. The apparatus of claim 18, further comprising:
means for processing a function when the presence of the conductive object is determined to be in a third region of the touch sensing device.

* * * * *